United States Patent [19]
Montgomery

[11] Patent Number: 5,340,469
[45] Date of Patent: Aug. 23, 1994

[54] APPARATUS FOR REMOVAL OF FAT, OIL AND GREASE FROM LAUNDRY WASH WATER

[75] Inventor: Stephen M. Montgomery, Gladstone, Mo.

[73] Assignee: Unitog Rental Services, Inc., Kansas City, Mo.

[21] Appl. No.: 142,235

[22] Filed: Oct. 25, 1993

Related U.S. Application Data

[60] Continuation of Ser. No. 739,521, Aug. 2, 1991, abandoned, which is a division of Ser. No. 558,677, Jul. 26, 1990, Pat. No. 5,076,937.

[51] Int. Cl.$^5$ .................. C02F 1/24; B01D 17/035
[52] U.S. Cl. .................. 210/96.1; 210/177; 210/221.2; 210/320
[58] Field of Search .............. 210/703–708, 210/724, 738, 754, 910, 96, 177, 181, 187, 199, 201, 202, 205, 221.1, 221.2, 320

[56] References Cited

U.S. PATENT DOCUMENTS

| | | | |
|---|---|---|---|
| 4,198,294 | 4/1980 | Deare | 210/708 |
| 4,316,805 | 2/1982 | Faust et al. | 210/708 |
| 4,790,943 | 12/1988 | Dunn et al. | 210/705 |
| 4,921,613 | 5/1990 | Nordberg et al. | 210/705 |

Primary Examiner—Thomas Wyse
Attorney, Agent, or Firm—Michael Yakimo, Jr.; D. A. N. Chase

[57] ABSTRACT

Method and apparatus for removing impurities from a laundry wash effluent including the steps and means therefor of acidifying the solution, infusing a gas into the solution and coalescing the released contaminant droplets by means of baffle plates into droplets sufficient to achieve buoyancy with respect to the solution. The resulting top layer of buoyant droplets is skimmed from the solution and the remaining solution is adjusted to a neutral pH for discharge.

4 Claims, 2 Drawing Sheets

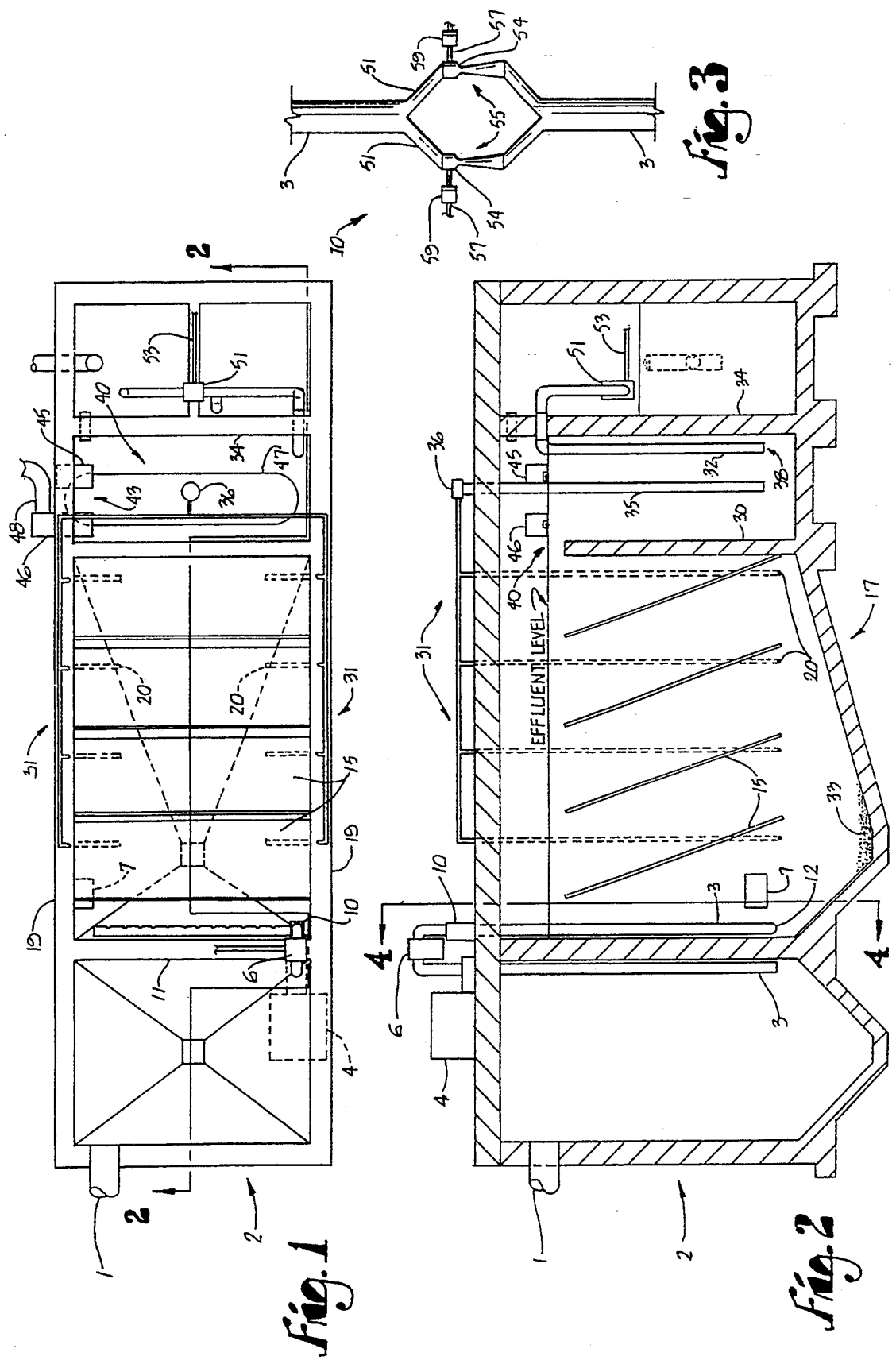

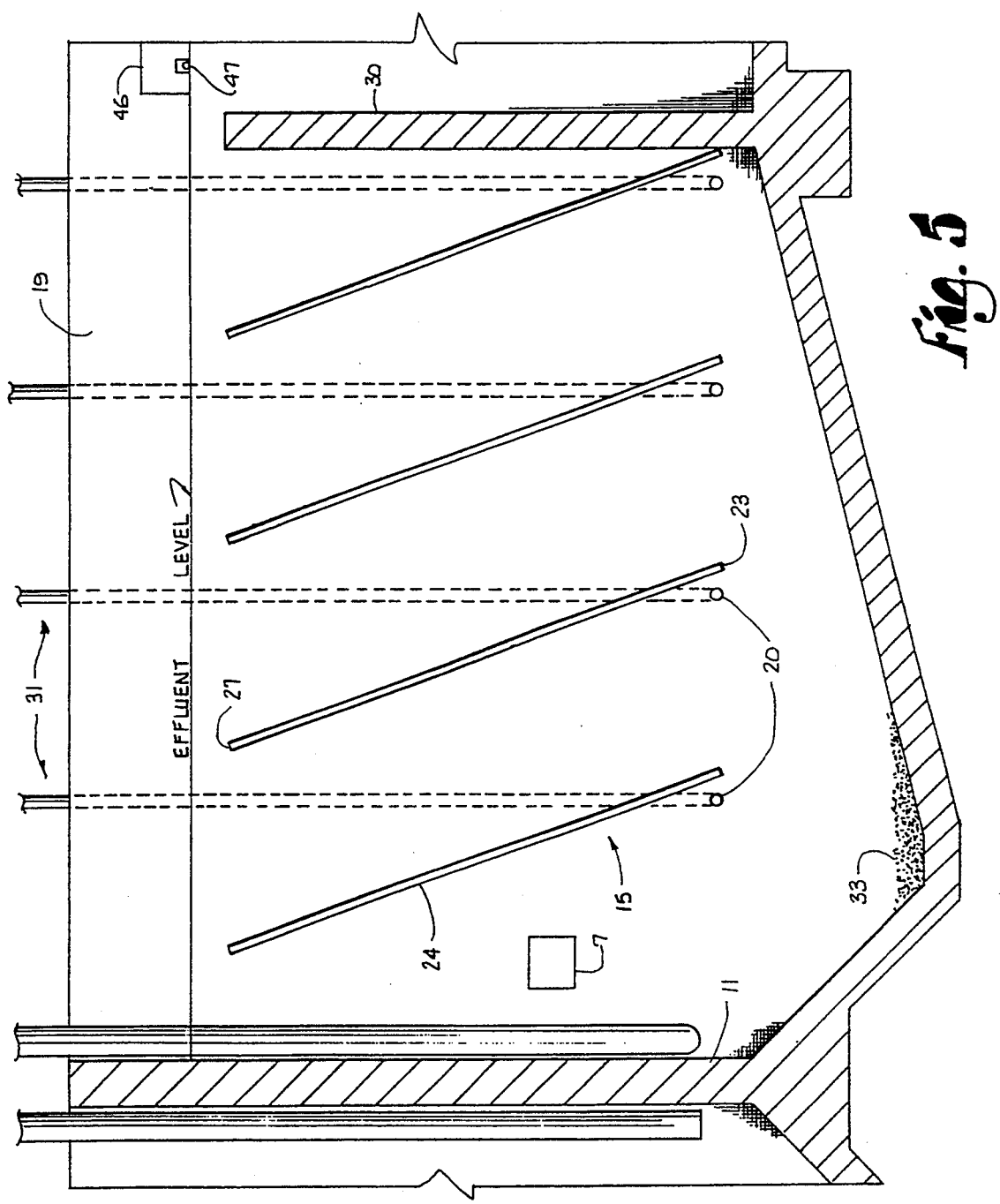
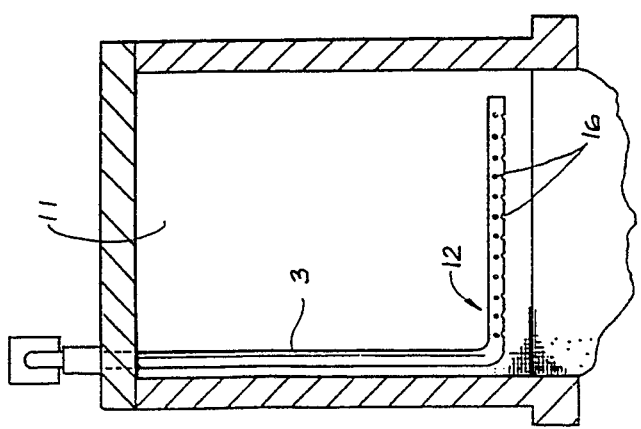

APPARATUS FOR REMOVAL OF FAT, OIL AND GREASE FROM LAUNDRY WASH WATER

This application is a continuation of application Ser. No. 07/739,521, filed Aug. 2, 1991 which is a division of application Ser. No. 07/558,677 filed Jul. 26, 1990, abandoned.

BACKGROUND OF THE INVENTION

This invention relates to a method and apparatus for reducing fat, oil and grease (FOG) contaminants in a laundry wash solution to permit discharge of the wash solution into the sewer system. More particularly, the method and apparatus described herein utilizes pH dependent surfactant chemistry to present a laundry surfactant which is capable of removing impurities, including FOG, from a laundry wash solution and later being deactivated as a surfactant to release the potentially polluting impurities to permit discharge of the wash water into the sewer system.

Discharge of contaminants into city sewer systems presents a significant problem to commercial laundries and industries which generate large volumes of aqueous solutions containing fat, oil and grease (FOG) contaminants. To discharge wash solutions into city sewer systems the level of FOG in the water, as well as other contaminants, must be reduced so discharge compliance may be accomplished. In the case of laundry operations this problem is a substantial concern as large volumes of discharge water are generated containing a variety of impurities and large amounts of hydrocarbon contaminants. These contaminants are removed from the soiled fabrics during the wash process and become chemically associated with the surfactant utilized to hold the impurities in aqueous solution. Since the object of an effective surfactant is to efficiently hold otherwise hydrophobic impurities in aqueous solution, the separation of surfactant bound hydrocarbons and impurities from the spent wash water is complicated by the primary utility of the surfactant. Therefore, the stronger or more efficient the surfactant in removing and suspending hydrophobic compounds in aqueous solution, the more difficult is the later separation of the impurities from the wash water.

In achieving efficiency in removal of FOG from laundry, surfactants have been developed which generate an emulsion with the FOG during the wash process. These emulsions tends to interfere with later removal of other water contaminants from spent wash solution. Therefore the emulsions compound the problem of cleaning the laundry waste stream by not only presenting greater difficulty in removing FOG from the water, but also in generating a FOG emulsion which interferes with the removal of other contaminants such as lead and other heavy metals which also must be removed prior to sewer discharge of the spent wash solution.

Attempts to break the FOG emulsion created by modern surfactants have generally had poor success. In particular, hydromechanical processes relying upon gravity separation alone are inefficient and time consuming. Other hydromechanical separating methods, utilizing the centrifugal force of a swirl chamber to create high g-forces to thereby separate oil and water are generally inefficient due to the surfactant creating a FOG emulsion which retards formation of sufficient oil droplet size to allow formation of an oil layer for mechanical separation from the water component.

Therefore, in order to efficiently separate FOG from wash water and permit removal of other contaminants it is necessary, at the conclusion of the wash cycle, to inhibit or reverse the emulsification of the FOG components. This surfactant reversal reduces or eliminates the FOG emulsion in aqueous solution so the FOG may be removed from the water without the interference of the previously desired emulsifying qualities of the surfactant. The resulting effect is that the FOG components will then exhibit normal hydrophobic characteristics.

One such method of accomplishing this result is to employ a surfactant which first may be utilized as a traditional surfactant to solubilize hydrophobic agents and suspend them in water. The surfactant is then capable of modification so as to reduce or remove its surfactant ability and permit release of the previously suspended hydrophobic constituents from the emulsion formed with the surfactant. Such surfactant reversibility is exhibited by amine based surfactants which within an alkaline or high pH environment act as typical nonionic surfactants and exhibit detergent action. However, in an acidic environment these amine surfactants loose their detergent abilities and perform as deemulsifiers to break down the stable emulsions of FOG in wash water and allow the FOG to separate from the aqueous phase.

Conventional surfactants utilized in laundry operations consist of a carboxyl group core as with the alcohol ethoxylate or ethylene glycol based surfactants. The surfactants utilized in the present invention, however, make use of a cationic amino group as the active moiety with a nonionic polyethoxy chain or other suitable hydrocarbon chain including additional de-emulsifying moieties to yield compounds whose surface active properties and water solubility depend directly on the pH of the solution in which they are present. These compounds are known generally as polyethoxy amines and have long been known as a class of compounds and have recently received attention as alternative laundry surfactant.

In solutions of high alkalinity or high pH of approximately 10 pH units or higher these compounds exist in the free amine form and function as nonionic surfactants. These amine surfactants act as typical nonionic surfactants and exhibit the same detergent powers of other, more commonly used, surfactants in an alkaline media. Historically, the cost of utilizing polyethoxy amines as wash surfactants has held the disadvantage of higher costs than the generally used ethoxylate compounds. However, with the increased costs associated with post wash cycle cleanup of spent washing solutions taken into consideration the initial higher cost of the amine surfactant compound can offer a cost effective option when the costs of spent wash solution cleanup are considered. In addition, the greater detergency efficiency of the amine compounds as compared to more commonly used surfactants, when identical quantities as a percentage by weight are used in the manufacturing of laundry detergent, allows an additional consideration in offsetting their slightly higher costs to end commercial applications. The recommended level of amine surfactant is in the range of 5 to 10 percent of the wash compound formulation as opposed to quantities as high as 20 percent of some currently utilized surfactant products.

The separation of the FOG from a reversible surfactant appears initially as finely divided droplets which do not tend to immediately separate from the water phase.

This is due to surfactant activity being directed, essentially, to the molecular characteristics of impurities that affect solubility. As a result, impurities are released as individual molecules or as small groups of electronically alike charged particles which must then form into larger bodies or groups before achieving a sufficient buoyant size within the solution or sufficient electronic repulsion to overcome the adhesion to the surrounding water molecules to allow gravitational separation from the solution.

This need for impurity coalescence presents an additional problem in the separation of impurities on a commercial scale. To achieve simple gravitational separation from the aqueous solution a substantial amount of time is required for sufficient grouping of impurities to occur to allow eventual separation by the specific gravity of the respective impurities from the water solution. As commercial laundry operations discharge large quantities of cleaning solutions which must undergo separation, time of separation, as well as cost, is a major consideration in developing efficient separation methods for impurity removal.

It is, therefore, a general object of the present invention to provide a method and apparatus which overcomes the separation difficulties with respect to the presence of FOG emulsions in wash water.

Another important objective of this invention is to provide a method for breaking emulsions of FOG and impurities in wash water and thereby remove emulsion interference with the separation of heavy metals and other impurities contained in the wash water.

Still another important objective of the invention is to provide an apparatus for breaking up FOG emulsions in wash water and permitting the fat, oil and grease droplets to coalesce into a layer which may be removed from the aqueous solution.

Another important objective of this invention is to provide a time and cost efficient method of separating FOG from wash water so that pollutant free discharge of the waste water into public sewer systems that meet or exceed ordinance limits may be accomplished.

Yet another important objective of the invention is to provide a method and apparatus for emulsion reversal which permits wash water surface quiescence and to allow FOG accumulation atop the water layer during a continuous flow process.

Still another important objective of the present invention is to provide a method of rapidly and efficiently changing the pH of large quantities of spent wash effluent while avoiding wide pH changes during the acid injection process and while providing sufficient acid mixing with the effluent.

Another important objective of the invention is to provide a continuous flow process which allows sufficient time to accommodate complete reversion of the FOG emulsion and allow sufficient time for optimum separation of the FOG from the wash effluent.

Furthermore, it is an important objective of this invention to provide a cost efficient method of cleaning fat, oil and grease containing wash water while retaining the substantial cleaning properties of efficacious detergents.

Other objects and advantages of the invention will become apparent from the specification, drawings and claims.

SUMMARY OF THE INVENTION

Effluent or aqueous solution containing a pH activated surfactant from a wash process is delivered to a surge basin to allow rapid voiding of the washing apparatus. The surge basin is equipped with a heat exchanger to transfer waste heat from the spent wash effluent into second fresh wash solution for use in later cleaning processes. The effluent from the surge basin is then pumped through a pipe which divides into smaller tubes each equipped with a venturi effect acid injection unit. The venturi injectors draw acid into the effluent to accomplish immediate acidification of the spent wash solution or effluent. The acid injection is controlled by a pit monitor connected to a solenoid valve located between the venturi injector and, the acid supply. The pit of the wash effluent is monitored after it is past the acid injection unit. The effluent, after acidification, is carried into an equalization basin wherein the pH of the solution is approximately 3.8 to 4.0 pH units. The effluent is discharged from the equalization basin through a below surface take-off pipe to promote surface quiescence within the equalization basin for FOG accumulation atop the water.

Within the equalization basin FOG emulsion breakdown occurs allowing separation of the FOG and other impurities associated with the now deactivated surfactant from the water. Coalescence of the released fat, oil and grease droplets is promoted by the injection or infusion of a gas or gas/water mixture into the effluent solution near the bottom of the equalization basin. The entry of the gas into the effluent presents rising gas bubbles which accelerate the FOG separation by coalescing with the oil and grease droplets to increase buoyancy of the droplets. Regulation of the injected gas controls the creation of a bubble size which promotes such coalescence. Non-regulated injection of gas can potentially create too large a bubble size which inhibits oil droplet coalescence. Also contained within the equalization chamber are baffle plates which serve to accumulate fat, oil and grease droplets on their Surface and thereby promote contact with the rising gas bubbles and contact between other fat, oil and grease droplets for an increase in droplet size and buoyancy and enhancement of the formation of a fat, oil and grease layer atop the effluent.

As the fats, oil and grease layer is formed atop the effluent the layer is removed by a skimming device. The skimming device is a continuous loop tube or rope which lies upon the water surface and is pulled through the oil layer. Oil and grease adhere to the rope surface which is then passed, through a scraper assembly to clean the oil from the rope. The oil is then collected in a trough underneath the scrapers and emptied into a waste oil storage container. The clean water layer or effluent layer is removed from the equalization basin and its pH is adjusted in the discharge area with a strong base, such as sodium hydroxide, to a near neutral pH to permit water discharge into the sewer. Alternatively the FOG free water may proceed to further cleaning procedures.

DESCRIPTION OF THE DRAWINGS

FIG. 1 is a plan view of the present invention showing from left to right the surge basis, the equalization basin and the discharge area.

FIG. 2 is an enlarged, fragmentary; vertical cross section, taken along line 2—2 of FIG. 1, and illustrates the placement of the baffle plates, gas injector nozzles and the effluent entry and discharge points.

FIG. 3 is an enlarged, fragmentary view of the acidification unit.

FIG. 4 is a fragmentary vertical cross section taken along line 3—3 of FIG. 2, and illustrates the subsurface entry of the effluent into the equalization basin.

FIG. 5 is an enlarged, fragmentary vertical cross section of the equalization basin as viewed in FIG. 2.

DESCRIPTION OF THE PREFERRED EMBODIMENT

The Surge Basin

Referring to FIGS. 1 and 2 the illustrated surge basin 2 initially receives wash effluent or spent wash solution from the wash machines which has been collected at the conclusion of the wash cycle. The wash water is collected in a trench running underneath the wash machines. The trench discharges the effluent solution into the surge basin 2 through inlet 1. Pump 4 transfers effluent from the surge basin 2 through effluent transfer pipe 3 and through a heat exchanger unit 6 which transfers waste heat from the effluent to new wash solution to be used in future wash cycles. The effluent then continues from the heat exchanger 6 to the acid injector unit 10.

In the acid injector unit 10 the effluent transfer pipe 3 divides into a plurality of smaller pipes 51 as shown in FIG. 3. Each of the smaller pipes 51 contains a venturi type injector 55 which reduces the pressure therein so as to draw acid at a higher pressure into the effluent stream from acid supply line 57 connected to the injector 55 at neck 54. This acid injection accomplishes acidification of the effluent. Entry of acid into the injectors 55 is controlled by a solenoid valve 59 located between the injector 55 and the acid supply source (not shown). The opening and closing of the solenoid valve 59 is responsive to the pH of the effluent after it is discharged from the acid injection unit. This action is provided by a pH monitor device 7 which may be located in either time equalization basin 17, as shown, or in equalization basin effluent distribution pipe 12 or other suitable monitoring location.

In operation as the pH of the effluent, after passing the acid injection unit 10, rises above a predetermined pH level an electric impulse is sent from the pH monitor 7 to the solenoid valve 59. The solenoid valve opens in response to the impulse and acid flows into the effluent stream until the electric impulse ceases. If the pH of the effluent stream is determined to be lower than a predetermined set point the solenoid valve 59 is closed and acid ceases to enter the effluent stream. The pH of the effluent after it leaves the acid injection unit 10 is to be in the range of 3.8 to 4.0 pH units.

In operation, upon entering the acidification unit, the effluent stream is divided and flows through a series of 1½ inch venturi type injectors. Acid is drawn into the effluent or solution stream at a rate of 0.61 gallons of 98 percent by weight sulfuric acid per 1,000 gallons of effluent flow. After acidification the effluent lines again consolidate into a single 6 inch effluent transfer pipe 3 which then passes into the equalization basin 17 and distributes the effluent from distribution pipe 12. The distribution pipe 12 is situated within the equalization basin approximately 18 inches above the bottom edge of the front basin wall 11 and runs along the front wall 11 of the equalization basin. Referring to FIG. 1 the effluent distribution pipe 12 may be seen in position along the front wall 11 of the equalization basin 17.

Referring now to FIG. 4, the distribution pipe 12 contains discharge holes 16 which are placed along the bottom and sides of the distribution pipe 12. The orientation of the discharge moles 16 along the sides and bottom of the distribution pipe 12 isolates water disturbance in the equalization basin 17 at the bottom of the basin thus assisting in surface quiescence within the equalization basin to promote separation of FOG from the effluent. This design also eliminates solids accumulation with the distribution pipe 12, thus allowing the settling of accumulated solids 33 within the equalization basin 17.

The Equalization Basin

Within the equalization basin 17 the acidified effluent solution begins to separate into three phases as the low pH of the acidification process deactivates the alkaline pH active amine surfactant and allows the FOG emulsion to break-up. Solids 33 held in solution suspension as well as particles 33 held in association with the active surfactant settle to the bottom of the basin for later removal. Fats, oils, and grease (FOG), formerly associated with the active surfactant, and which lave been released due to the addition of acid thus deactivating the surfactant are released into the aqueous effluent solution.

Referring now to FIG. 5, to promote efficient separation of the FOG from the aqueous solution the equalization basin 17 is provided with a number of baffles 15. The lower edge 23 of each baffle is approximately 12 inches above the bottom of basin side walls 19 at which the basin walls begin to merge inwardly to form an inverted cone. The upper edge 27 of each baffle 15 is approximately 3 to 6 inches below the effluent surface. The baffles 15 are placed with the upper edge 27 of the baffle being at approximately all 8 degree angle from vertical and inclined toward the distribution pipe 12 of the basin 17 with the lower edge 23 of the baffle being approximately 3 inches down stream with respect to the upper edge 27. The baffles 15 provide a large surface area for agglomeration of FOG thus permitting the FOG to coalesce into droplets of a sufficient size to become buoyant in the solution and rise to the effluent surface to create a FOG layer atop the aqueous layer of the solution.

Near the lower edge 23 of each baffle 15 is an injection port 20 for introduction of a gas or gas and effluent stream into the acidified effluent of the equalization basin. Referring now to FIG. 1, the infusion of the gas stream is accomplished by incorporating a pump (not shown) operated recirculating system 31 within the equalization basin which draws acidified effluent from suction line 35 and introduces gas or air into the recirculating system 31 at gas intake 36. Injection of the gas/effluent stream into the equalization basin 17 occurs at ports 20 beneath the baffles 15. The effervescent action of the released gas causes the FOG to rise more rapidly out of the aqueous effluent. The rising gas bubbles serve to coalesce with released fats, oil, and grease increasing their buoyancy as well as to accumulate along the lower surface 24 of the baffles 15 allowing additional coalescence of FOG into larger more buoyant droplets.

Air may be used as the gas for addition to the effluent recirculating stream or, where the presence of organic solvents in the effluent is a problem, ozone may be added to the recirculating stream to assist in the break down of these pollutants.

Again referring to FIG. 2, the equalization basin 17 is provided with a sludge wall 30 which separates the accumulated solids 33 in the bottom of the equalization basin 17 from the effluent take off line 32 and which assists in promoting solution surface quiescence in the oil skimming area 40.

FOG Skimming Area

Once a FOG layer has formed atop the effluent it is skimmed off the surface in an area 40 (FIG. 2) near the effluent take off line 32. Various devices are available for skimming surface oil from aqueous layers. In one embodiment of the present invention a polypropylene tube or "rope" 47 lies on the water surface forming a continuous loop which passes through the drive mechanism 45 of the skimmer unit 43. The skimmer unit 43 pulls the rope 47 through the accumulated FOG layer allowing FOG components to accumulate on the surface of the rope 47. After the rope 47 has passed across the surface of the effluent and has become coated with FOG components resting on the top of the effluent the rope 47 then passes through a, scraper 46 assembly which wipes the oil from the rope and deposits the oil in a trough 48 below the scrapers which then empties into an oil storage container (not shown). The cleaned rope 47 continues its movement back across the oil layer for additional collection of FOG.

Removal of FOG free effluent from the equalization basin 17 is by means of effluent take off line 32 which passes through the back basin wall 34 at the opposite end of the equalization basin 17 from the effluent distribution pipe 12. Effluent is removed from the basin below the effluent solution surface at take off inlet 38 to avoid disturbance of the FOG layer.

Discharge Area

After leaving the equalization basin 17 the pH of the effluent may be adjusted to near the neutral-range of pH 7 by addition of sodium hydroxide or other suitable base to permit discharge of the effluent into the sewer system. Alternatively upon leaving the equalization basin the effluent may be transported to another area for additional treatment.

In operation, referring now to FIG. 1, the effluent is removed from the equalization basin by effluent take off pipe 32. The effluent is then passed into flow meter 51 where the amount of discharge flow is measured and sufficient base is added through line 53 which is attached to the base supply (not shown). The addition of base to the effluent brings the effluent pH into a pH neutral range.

In adjusting the pH of the effluent the dosage of base needed to achieve the relatively neutral pH range may be calculated from the known pH of the acidified effluent contained within the equalization basin and the proper amount of base added through a simple flow meter arrangement 51 to add in a predetermined quantity of base per volume of effluent discharge.

While a specific embodiment of the invention and test results have been enclosed in the foregoing description, it will be understood that various modifications within the spirit of the invention may occur to those skilled in the art. Therefore, it is intended that no limitations be placed on the invention except as defined by the scope of the appended claims and allowable functional equivalents thereof.

Having thus described the invention, what is claimed as new and desired to be secured by Letters Patent:

1. An apparatus for removing impurities, including oil and grease droplets, held in association with a pH activated surfactant in an aqueous wash solution comprising:
   a surge basin adapted to receiving the aqueous wash solution;
   means for acidifying the wash solution to deactivate the surfactant and cause release of the impurities held in association with the surfactant, said acidifying means being operable in response to the pH of the wash solution;
   means for discharging the acidified wash solution into a second basin at a location adjacent the bottom of said basin, said bottom discharge enhancing quiescence of a top surface of the solution in said second basin;
   at least one submerged baffle plate extending at an angle from said discharge location and towards the top of said wash solution surface and across said discharge location, said at least one plate positioned to enhance capture of released oil and grease droplets on a lower surface of said at least one plate and coalescence of droplets thereon into a droplet size sufficient for buoyancy, said coalesced droplets forming a layer atop said wash solution;
   injector means in said second basin for infusing a gas into said acidified wash solution adjacent said second basin bottom to provide rising effervescent gas bubbles, said bubbles further coalescing with said coalesced droplets to increase droplet buoyancy and urge the same towards the layer atop said wash solution surface;
   means for skimming the oil and grease droplet layer from the surface of the wash solution;
   means for adjusting the pH of the wash solution to a relatively neutral pH; and
   means for discharge of the wash solution from said second basin.

2. The apparatus as recited in claim 1, wherein one of said surge basins contains a means for transferring heat from the spent aqueous wash solution to a second wash solution.

3. The apparatus as recited in claim 1, wherein the means for acidification comprises a plurality of venturi type injectors for adding an acid to the wash solution prior to discharge into said second basin.

4. The apparatus as recited in claim 1, wherein the means for acidification is controlled by a solenoid valve operably connected to a means for determining the pH of the solution delivered to the equalization basin.

* * * * *

UNITED STATES PATENT AND TRADEMARK OFFICE
CERTIFICATE OF CORRECTION

PATENT NO. : 5,340,469
DATED : August 23, 1994
INVENTOR(S) : Stephen M. Montgomery It is certified that error appears in the above-indentified patent and that said Letters Patent is hereby corrected as shown below:

Column 1, line 6, after "1991" insert --, abandoned,--.

Column 1, line 7, delete "abandoned" and substitute --Pat. No. 5,076,937--

Signed and Sealed this

Twenty-fifth Day of October, 1994

Attest:

BRUCE LEHMAN

*Attesting Officer*    *Commissioner of Patents and Trademarks*